(12) United States Patent
Jasny et al.

(10) Patent No.: US 11,975,843 B2
(45) Date of Patent: May 7, 2024

(54) SEAT ASSEMBLY, IN PARTICULAR FOR AN AIRCRAFT

(71) Applicant: Safran Seats, Plaisir (FR)

(72) Inventors: Franck Jasny, Venesmes (FR); Charles Ehrmann, Les Breviaires (FR); Laurent Ligonniere, Issoudun (FR); Daniele Guerra, La Chapelle Saint Ursin (FR); Blong Siong, Chateauroux (FR)

(73) Assignee: Safran Seats, Plaisir (FR)

( * ) Notice: Subject to any disclaimer, the term of this patent is extended or adjusted under 35 U.S.C. 154(b) by 268 days.

(21) Appl. No.: 17/607,680

(22) PCT Filed: Apr. 20, 2020

(86) PCT No.: PCT/EP2020/060959
§ 371 (c)(1),
(2) Date: Oct. 29, 2021

(87) PCT Pub. No.: WO2020/221610
PCT Pub. Date: Nov. 5, 2020

(65) Prior Publication Data
US 2022/0227493 A1    Jul. 21, 2022

(30) Foreign Application Priority Data
Apr. 30, 2019 (FR) ..................... 1904539

(51) Int. Cl.
*B64D 11/06* (2006.01)
(52) U.S. Cl.
CPC ...... *B64D 11/0641* (2014.12); *B64D 11/0601* (2014.12); *B64D 11/0605* (2014.12); *B64D 11/0606* (2014.12); *B64D 11/064* (2014.12)

(58) Field of Classification Search
CPC ............ B64D 11/0641; B64D 11/0601; B64D 11/0605; B64D 11/0606; B64D 11/064
See application file for complete search history.

(56) References Cited

U.S. PATENT DOCUMENTS

| 2013/0241247 A1* | 9/2013 | Wallace | ............. B64D 11/0604 |
| | | | 297/118 |
| 2017/0259923 A1* | 9/2017 | Morgan | ............. B64D 11/0644 |

(Continued)

FOREIGN PATENT DOCUMENTS

| FR | 3059951 A1 | 6/2018 |
| WO | 2015061688 A2 | 4/2015 |
| WO | 2015155687 A1 | 10/2015 |

OTHER PUBLICATIONS

International Patent Application No. PCT/EP2020/060959, International Search Report (with English translation) and Written Opinion, dated Jun. 17, 2020.

*Primary Examiner* — Rodney A Bonnette
(74) *Attorney, Agent, or Firm* — Kilpatrick Townsend & Stockton LLP

(57) ABSTRACT

The present invention relates to an assembly of individual seats intended to be installed in an aircraft cabin, the assembly comprising: —a first seat and a second seat, a central console arranged between the first seat and the second seat, the central console comprising a first foot area and a second foot area extending in two opposite directions, —a seat surface width of the first seat being smaller in a portion of the seat opposite the second foot area in relation to a width of a portion of the seat surface opposite the first foot area so as to increase a space between the seat surface of the first seat and the second foot area.

9 Claims, 3 Drawing Sheets

(56) References Cited

U.S. PATENT DOCUMENTS

| | | | |
|---|---|---|---|
| 2019/0210733 A1* | 7/2019 | Herault | B64D 11/0604 |
| 2021/0163140 A1* | 6/2021 | Jasny | B64D 11/0606 |
| 2022/0242571 A1* | 8/2022 | Dowty | B64D 11/0023 |

* cited by examiner

[Fig. 1]
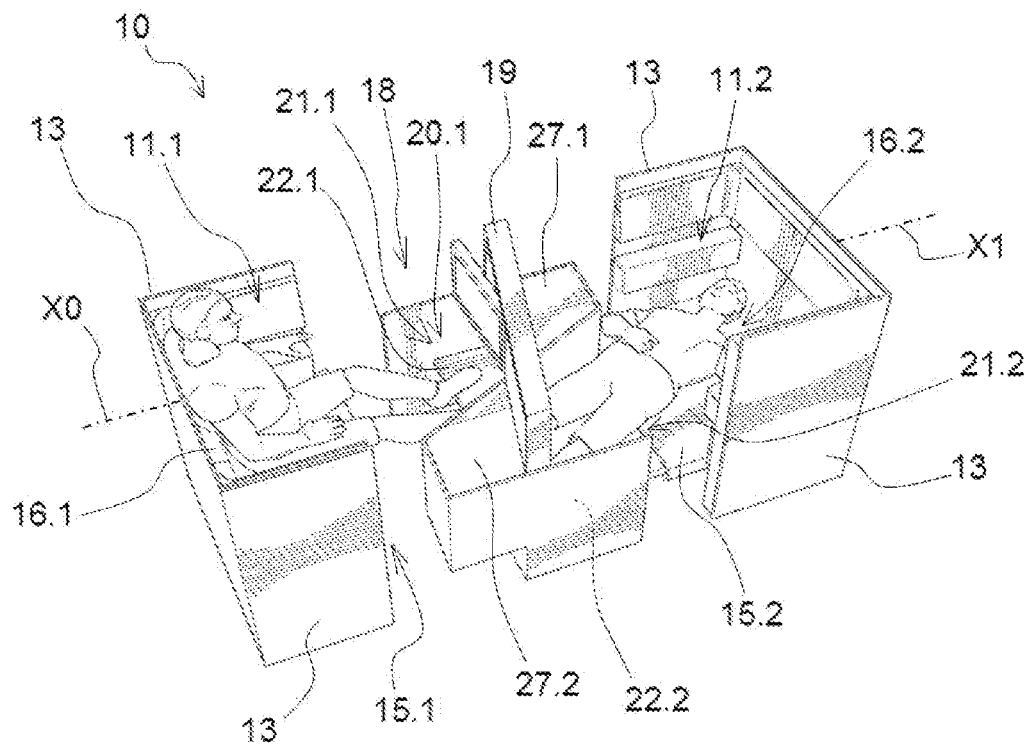
[Fig. 2]
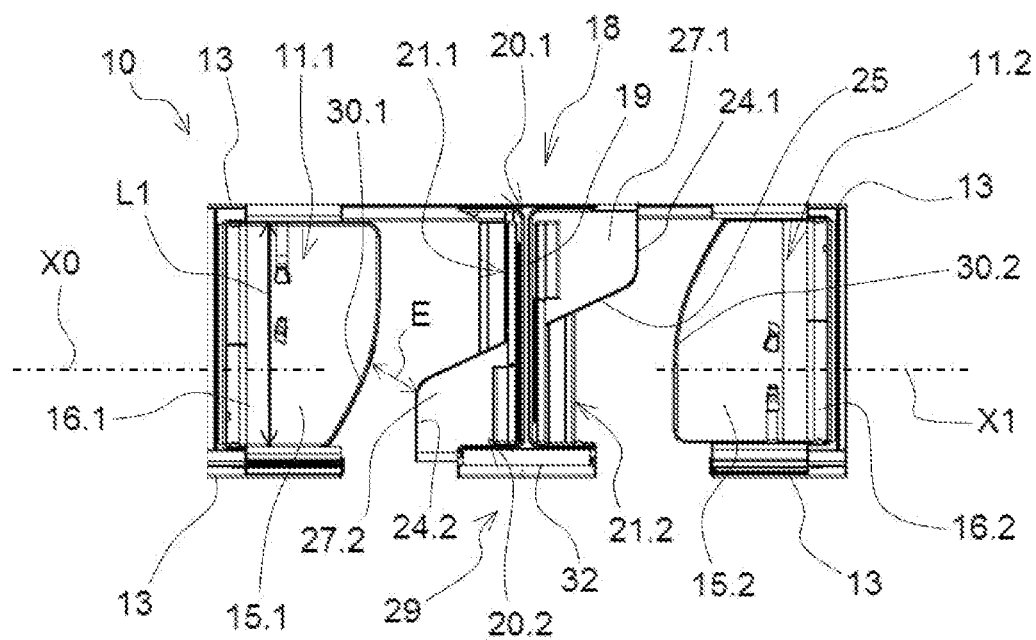

[Fig. 3]
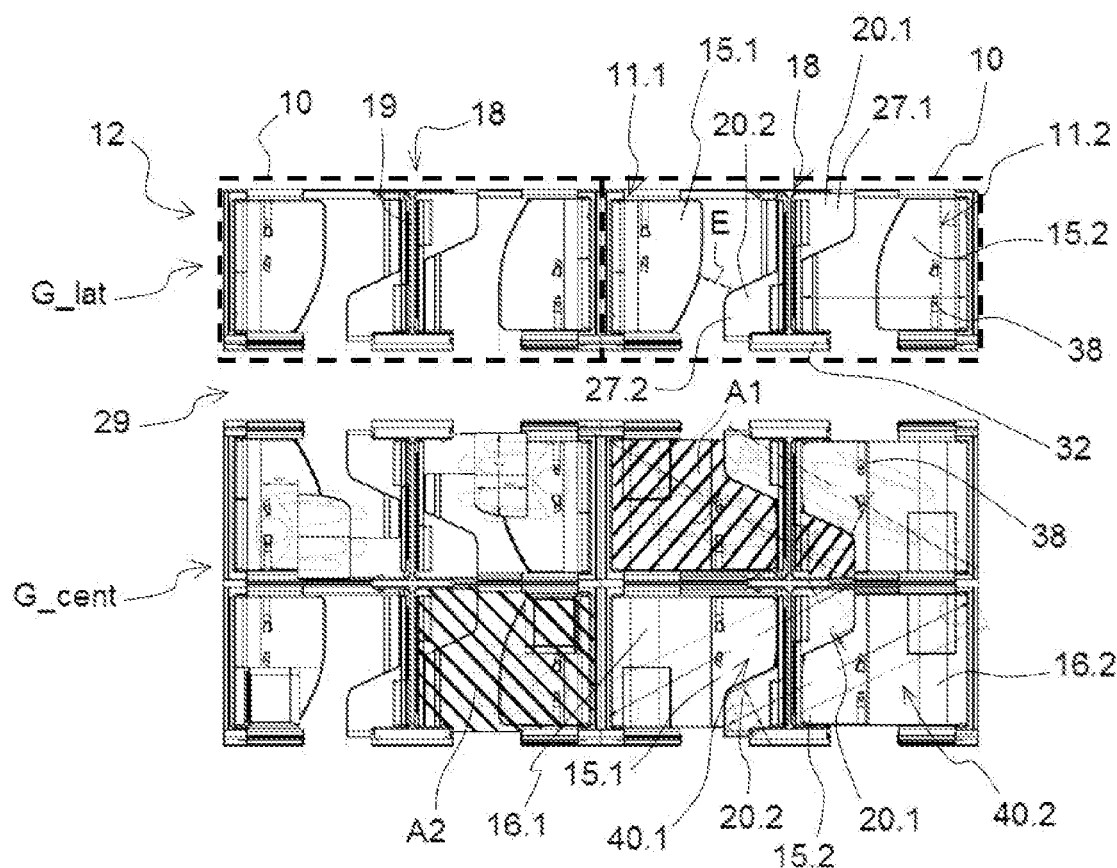
[Fig. 4a]
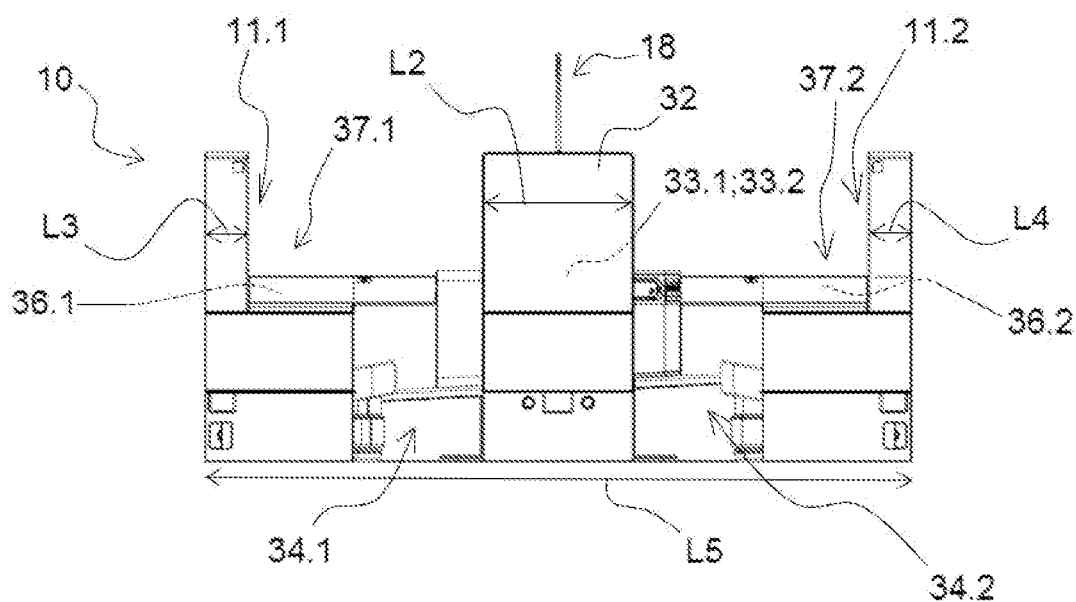

[Fig. 4b]
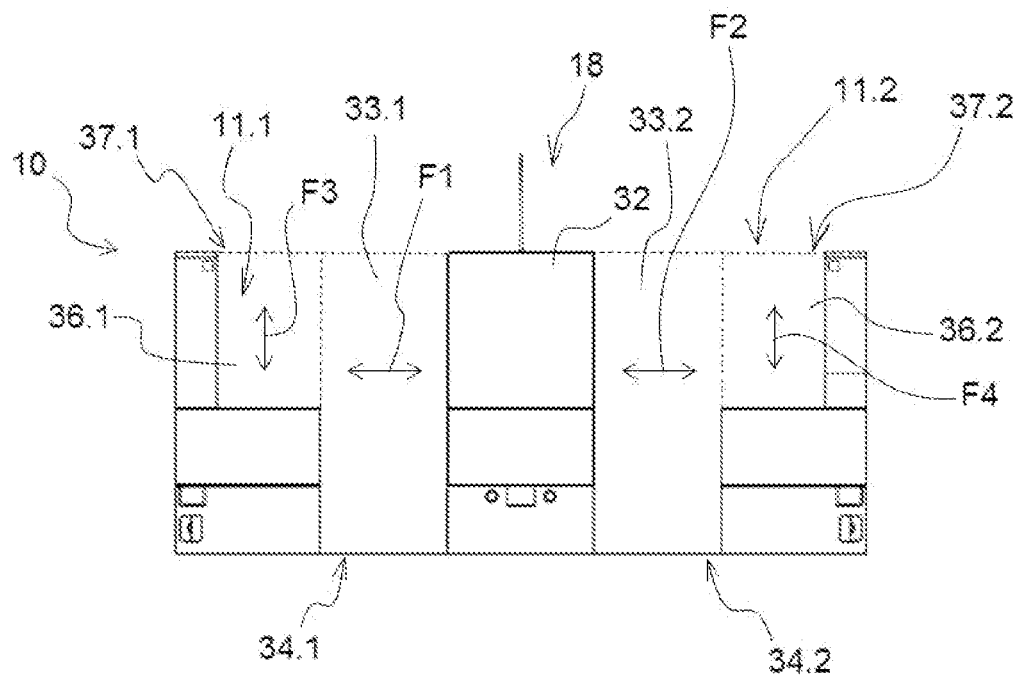
[Fig. 5]
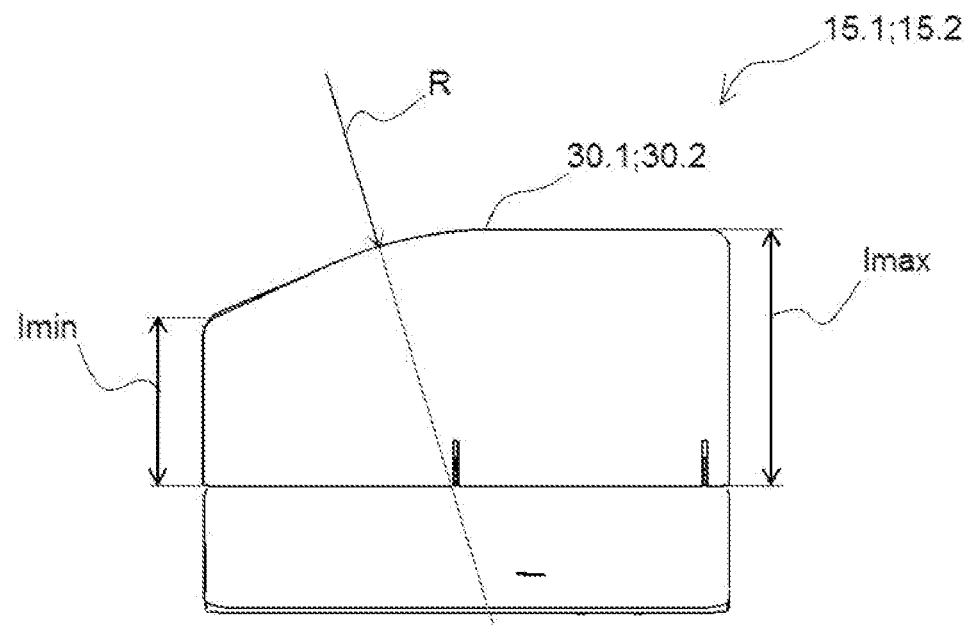

SEAT ASSEMBLY, IN PARTICULAR FOR AN AIRCRAFT

CROSS-REFERENCE TO RELATED APPLICATIONS

This application is a national stage application of International Patent Application PCT/EP2020/060959, filed on Apr. 20, 2020 and titled "SEAT ASSEMBLY, IN PARTICULAR FOR AN AIRCRAFT," which application claims priority to France Patent Application No. 1904539, filed on Apr. 30, 2019, each of which are hereby incorporated by reference in their entireties.

The present invention relates to an assembly of seats, in particular for an aircraft. The invention finds a particularly advantageous application with aircraft seats of the 'business class' type. The invention may also be implemented with seats for other means of transport, such as for example seats for buses, trains, or boats.

Aircraft seats of the 'Business class' type offer passengers different comfort positions from the 'seating' position to a 'lying' position in which the seat defines a substantially horizontal lying surface for the passenger.

Document WO2015/155687 describes an assembly of individual seats to be installed in an aircraft cabin and comprising a first seat and a second seat arranged facing each other. Each seat has a width which is greater than a width of a conventional seat, so that this allows the passenger to sit in different orientations. For example, a passenger may be seated so as to have his/her body oriented in a direction which is substantially parallel to the axis of the seat, or the passenger may be seated so as to have his/her body oriented with a non-zero angle up to 90 degrees to the axis of the seat.

A central console is arranged between the first seat and the second seat. The central console has a first foot zone and a second foot zone, which are open in two opposite directions. The first foot zone is associated with the first seat facing the opening of the first foot zone. The second foot zone is associated with the second seat facing the opening of the second foot zone.

Each foot zone is delimited by an upper wall forming a table for the seat which does not have access to the opening of the second foot zone. Such a configuration of the foot zones makes it possible to optimize the density of places inside the cabin but reduces the living space for the passenger due to the positioning of each foot zone close to the opposite seat. There is therefore a need for defining a configuration ensuring a compromise between the optimization of the number of seats and the space available for each passenger while complying with the safety conditions.

The objective of the invention is to effectively meet this need by providing an assembly of individual seats to be installed in an aircraft cabin, said assembly comprising:
- a first seat and a second seat arranged facing each other, each seat comprising a seating surface and a backrest,
- a central console arranged between the first seat and the second seat, said central console comprising a first foot zone and a second foot zone extending in two opposite directions,
- the first foot zone being associated with the first seat facing an opening of the first foot zone, said first foot zone being delimited by an upper wall forming a table for a passenger of the second seat with no access to the opening of the first foot zone.
- the second foot zone being associated with the second seat facing an opening of the second foot zone, said second foot zone being delimited by an upper wall forming a table for a passenger of the first seat with no access to the opening of the second foot zone, characterized in that a width of the seating surface of the first seat is smaller in a part of the seating surface facing the second foot zone with than a width of a part of the seating surface facing the first foot zone so as to increase a space between the seating surface of the first seat and the second foot zone.

According to one embodiment, in the part of the seating surface of the first seat facing the second foot zone, at least a portion of a front edge of said seating surface has a curved shape.

According to one embodiment, a width of the seating surface of the second seat is smaller in a part facing the first foot zone than a width of a part of the seating surface facing the second foot zone so as to increase a space between the seating surface of the second seat and the first foot zone.

According to one embodiment, in the part of the seating surface of the second seat facing the first foot zone, at least a portion of a front edge of said seating surface has a curved shape.

According to one embodiment, each seat has side edges substantially aligned with side edges of the other seat.

According to one embodiment, said assembly of seats comprises a double-door module provided with two movable doors each between a stored position and an extended position in which a door is able to transversely close a corresponding space between a seat and the central console.

According to one embodiment, said assembly of seats comprises two retractable panels movable between a stored position and an extended position in which a panel closes a corresponding space above a side edge of a seat on the side of an aisle.

According to an embodiment, a ratio of a sum of a width of the central console and two thicknesses of fixed shells surrounding the backrests divided by a length of one pitch of said assembly of two seats is between 25% and 40%, and is preferably of the order of 33%.

According to one embodiment, as a seat is convertible between a seating position and a lying position, a space between the seat and the central console is intended to be filled with at least a portion of the seat when the latter is in the lying position.

According to one embodiment, when a seat is in the lying position, at least a portion of the seat is vertically superimposed with a closed foot zone on the side of the seat comprising the seating surface.

According to one embodiment, as a lying surface is formed by at least a portion of the seat and at least a portion of the backrest when the seat is in the lying position as well as an internal wall of the open foot zone associated with said seat, a ratio of an area of the lying surface to an area of a living space associated with a seat is between 90% and 100%.

According to one embodiment, the central console comprises a partition wall.

The invention also relates to an aircraft cabin characterized in that it comprises at least one column of assemblies of seats as defined above.

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could contribute, if need be, to its definition, in which:

FIG. 1 is a perspective view of an assembly of two seats according to the present invention;

FIG. 2 is a top view of an assembly of two seats according to the present invention;

FIG. 3 is a top view of an aircraft cabin comprising assemblies of seats according to the invention showing layouts of the lying surfaces of the seats;

FIG. 4*a* is a side view of a assembly of two seats according to the invention provided with closure panels in the stored position;

FIG. 4*b* is a side view of an assembly of two seats according to the invention provided with closure panels in the extended position;

FIG. 5 is a top view of a seating surface of a seat according to the present invention.

It should be noted that, in the figures, the structural and/or functional elements common to the different embodiments may have the same references. Thus, unless otherwise stated, such elements have identical structural, dimensional and material properties.

FIGS. 1 and 2 show an assembly 10 of individual seats 11.1, 11.2 with an axis X0 to be installed in an aircraft cabin 12 (see FIG. 3). This assembly 10 comprises a first seat 11.1 and a second seat 11.2 facing each other. Each seat 11.1, 11.2 has an axis X1 which is a horizontal axis passing through a median plane of the seating surface and the backrest of the seat 11.1, 11.2. The axes X1 of the seats 11.1, 11.2 may coincide with the axis X0 of the assembly 10. Each seat 11.1, 11.2 has side edges 13 substantially aligned with side edges 13 of the other seat 11.1, 11.2. In a top view, the assembly 10 of two seats 11.1, 11.2 has a rectangular shape. Alternatively, it could have the shape of a non-right-angled parallelogram.

Each seat 11.1 (respectively 11.2) comprises a seating surface 15.1 (respectively 15.2) and a backrest 16.1 (respectively 16.2) which may, where appropriate, be made in two parts articulated with one another. Each seat 11.1, 11.2 has a width L1 which is greater than a width of a conventional seat, so that this allows a passenger to be seated in different orientations. For example, the passenger can be seated so as to have his/her body oriented in a direction which is substantially parallel to the axis X1 of the seat 11.1, 11.2, or so as to have his/her body oriented at a non-zero angle up to 90 degrees to the axis X1 of the seat 11.1, 11.2.

A central console 18 is arranged between the first seat 11.1 and the second seat 11.2. The central console 18 advantageously comprises a partition wall 19 between the two seats 11.1, 11.2. The partition wall 19 may include a location for mounting screens, and/or electronic devices, and/or storage compartments.

The central console 18 comprises a first foot zone 20.1 and a second foot zone 20.2 opened in two opposite directions. The first foot zone 20.1 and the second foot zone 20.2 project on either side of the partition wall 19 in two opposite directions.

The first foot zone 20.1 is associated with the first seat 11.1 facing the opening 21.1 of the first foot zone 20.1. The second foot zone 20.2 is associated with the second seat 11.2 facing the opening 21.2 of the second foot zone 20.2. Preferably, the first foot zone 20.1 and the second foot zone 20.2 are not superimposed along the axis X0 of the assembly 10. As a variant, the foot zones 20.1 and 20.2 may be partially superimposed along the axis X0.

The foot zones 20.1, 20.2 respectively comprise a horizontal internal wall 22.1, 22.2 on which the feet of a passenger can rest. The foot zones 20.1, 20.2 are each delimited by a corresponding background 24.1, 24.2, the bottoms 24.1, 24.2 being connected to one another by a common wall 25.

In addition, the foot zones 20.1, 20.2 each have respectively a corresponding upper wall 27.1, 27.2 on which the passenger of the opposite seat 11.1, 11.2 may in particular place objects. The upper wall 27.1, 27.2 thus forms a table that can serve as a work surface, a dining table, a cocktail table or any other usable surface for a passenger seated in the opposite seat 11.1, 11.2 (i.e. the seat 11.1, 11.2 with no access to the opening 21.1, 21.2 of the foot zone 20.1, 20.2). In other words, at least part of a foot zone 20.1, 20.2 extends in the living space of a passenger seated in the opposite seat 11.1, 11.2. The foot zone 20.1 thus comprises an upper wall 27.1 forming a table for the opposite seat 11.2. The foot zone 20.2 comprises an upper wall 27.2 forming a table for the opposite seat 11.1.

Thus, a given seat 11.1 (respectively 11.2) is associated with an open foot zone 20.1 (respectively 20.2) for receiving the feet of a passenger and with a closed foot zone 20.2 (respectively 20.1) penetrating into the passenger living space and forming a table.

As it can be seen in particular in FIG. 2, a width of the seating surface 15.1 of the first seat 11.1 is smaller in a part of the seating surface 15.1 facing the second foot zone 20.2 than a width of a part of the seating surface 15.1 facing the first foot zone 20.1 so as to increase a space E between the seating surface 15.1 of the first seat 11.1 and the second foot zone 20.2. In other words, the width of the seating surface 15.1 is smaller on the side of the closed foot zone 20.2 than on the side of the open foot zone 20.1 associated with the seating surface 15.1. Given that in the example shown this space E opens out to an aisle 29, the shape of the seating surface 15.1 with reduced width on the side of the second foot zone 20.2 facilitates passenger access to this aisle 29, especially in an emergency.

In the part of the seating surface 15.1 of the first seat 11.1 facing the second foot zone 20.2, at least a portion of a front edge 30.1 of said seating surface 15.1 has a curved shape. This curved portion of the front edge 30.1 of the seating surface 15.1 is located in the extension of a rectilinear portion of the front edge 30.1 facing the first foot zone 20.1. As it can be seen in FIG. 5, the curved portion could be defined for example by a radius of curvature R of the order of 70 cm. As a variant, the curved portion of the front edge 30.1 could be replaced with a beveled shape. A maximum width lmax of the seating surface 15.1 is for example of the order of 45 cm and a minimum width lmin of the seating surface 15.1 is for example of the order of 30 cm. The expression "of the order of" means a variation of plus or minus 10% around the target value.

Furthermore, a width of the seating surface 15.2 of the second seat 11.2 is smaller in a part facing the first foot zone 20.1 than a width of a part of the seating surface 15.2 facing the second foot zone 20.2 so as to increase a space E between the seating surface 15.2 of the second seat 11.2 and the first foot zone 20.1. In other words, the width of the seating surface 15.2 is smaller on the side of the closed foot zone 20.1 than on the side of the open foot zone 20.2 associated with the seating surface 15.2.

In the part of the seating surface 15.2 of the second seat 11.2 facing the first foot zone 20.1, at least a portion of a front edge 30.2 of said seating surface 15.2 has a curved shape. This curved portion of the front edge 30.2 of the seating surface 15.2 is in the extension of a rectilinear portion of the front edge 30.2 facing the first foot zone 20.1.

As it can be seen in FIG. 5, the curved portion could be defined for example by a radius of curvature R of the order of 70 cm. As a variant, the curved portion of the front edge 30.2 could be replaced with a bevelled shape. A maximum width lmax of the seating surface 15.2 is for example of the order of 45 cm and a minimum width lmin of the seating surface 15.2 is for example of the order of 30 cm.

Furthermore, a double-door module 32 is provided with two doors 33.1, 33.2 movable between a stored position shown in FIG. 4a and an extended position shown in FIG. 4b in which a door 33.1, 33.2 is able close transversely, on the side of the aisle 29, a corresponding space 34.1, 34.2 between a seat 11.1, 11.2 and the central console 18. Thus, a first door 33.1 is able to close a first space 34.1 between the first seat 11.1 and the central console 18 when the first door 33.1 is in the extended position. The second door 33.2 is able to close a second space 34.2 between the second seat 11.2 and the central console 18. When the doors 33.1, 33.2 are in the stored position, the doors 33.1, 33.2 at least partially overlap inside the double-door module 32. A door 33.1, 33.2 is movable between the stored position and the extended position according to a lateral translational movement, as illustrated by the arrows F1 and F2.

In addition, two retractable panels 36.1, 36.2 are movable between a stored position shown in FIG. 4a and an extended position shown in FIG. 4b in which a panel 36.1, 36.2 closes a corresponding space 37.1, 37.2 arranged above a side edge 13 of a seat 11.1, 11.2 on the side of an aisle 29. Thus, a first panel 36.1 is able to close a first space 37.1 above a side edge 13 of the first seat 11.1 when the panel 36.1 is in the extended position. A second panel 36.2 is able to close a second space 37.2 above a side edge 13 of the second seat 11.2 when the panel 36.2 is in the extended position. A retractable panel 36.1, 36.2 is movable between the stored position and the extended position according to a vertical movement, as illustrated by the arrows F3 and F4.

A ratio of a sum of a width L2 of the central console 18 and two thicknesses L3 and L4 of fixed shells surrounding the backrests 16.1, 16.2 divided by a length L5 of a pitch of the assembly 10 of two seats 11.1, 11.2 is between 25% and 40%, and preferably of the order of 33%. The expression "of the order of" means a variation of plus or minus 10% around the target value. It is reminded that a pitch of two seats 11.1, 11.2 corresponds to the length of an assembly 10 of two seats 11.1, 11.2 inside the aircraft cabin 12. Such a ratio makes it possible to guarantee a sufficient space between these different elements of the assembly 10 for evacuating passengers in an emergency.

A seat 11.1, 11.2 is convertible, via adapted kinematics, between a "seating" position, corresponding to the position used in particular during the stopping, take-off, and landing phases of the aircraft, and a "lying" position, in which the seating surface 15.1, 15.2 is moved in translation forwards (cf. displacement of the belt buckles 38 in FIG. 3) while the backrest 16 tilts substantially horizontally, that is to say it forms an angle between plus 20 degrees and minus 20 degrees from the horizontal.

The space between the central console 18 and a seat 11.1 (respectively 11.2) is filled with at least a portion of the corresponding seat 11.1 (respectively 11.2), in particular the seating surface 15.1 (respectively 15.2) and, if applicable, a portion of the backrest 16.1 (respectively 16.2) when the seat 11.1 (respectively 11.2) is in the lying position.

Advantageously, when the seat 11.1 (respectively 11.2) is in the lying position, at least a portion of the seating surface 15.1 (respectively 15.2) is superimposed vertically with the closed foot zone 20.2 (respectively 20.1) on the side of the seat 11.1 (respectively 11.2) comprising the seating surface 15.1 (respectively 15.2). In this case, a portion of the seating surface 15.1 (respectively 15.2) may be placed under the closed foot zone 20.2 (respectively 20.1) associated with said seating surface 15.1 (respectively 15.2).

A lying surface 40.1 (respectively 40.2) is then formed by at least a portion of the seating surface 15.1 (respectively 15.2) and at least a portion of the backrest 16.1 (respectively 16.2) when the seat 11.1 (respectively 11.2) is in the lying position as well as an internal wall of the open foot zone 20.1 (respectively 20.2) associated with said seat 11.1 (respectively 11.2).

Advantageously, according to an optimal configuration shown in FIG. 3, a ratio of an area A1 of a lying surface 40.1, 40.2 to an area A2 of a living space associated with a seat 11.1, 11.2 is between 90% and 100%. The area A2 of a living space is delimited, in a top view, by the backrest 16.1 (respectively 16.2) of a seat 11.1 (respectively 11.2), a median plane of the central console 18 parallel to the backrest 16.1 (respectively 16.2) of the seat 11.1 (respectively 11.2) and two segments each passing through a side edge 13 of a seat 11.1 (respectively 11.2) and extending between the backrest of the seat 11.1 (respectively 11.2) and the median plane of the center console 18. The median plane of the central console 18 may correspond to the partition wall 19.

According to alternative embodiments, the seat 11.1, 11.2 can also take intermediate positions, called "relaxing" positions, between the two extreme positions formed by the seating position and the lying position.

As a variant, as the seat 11.1, 11.2 has a fixed configuration, the space between the seat 11.1 (respectively 11.2) and the central console 18 is to be filled with an added cushion defining part of the lying surface 40.1, 40.2. The added cushion may be stored under a seating surface 15.1, 15.2 of a corresponding seat 11.1, 11.2. In this case, the different parts of the seat (seating surface 15 and backrest 16) may be fixed.

In the example shown in FIG. 3, the aircraft cabin 12 comprises several columns of assemblies 10 of seats 11.1, 11.2. The aircraft cabin 12 may thus include one or two side groups G_lat respectively formed by a column of assemblies 10 of seats 11.1, 11.2 positioned along a side wall of the fuselage of the aircraft cabin 12. In addition, a central group G_cent preferably consists of two columns of assemblies 10 of seats 11.1, 11.2. In such an arrangement, the columns of seats 11.1, 11.2 of the central group G_cent are advantageously placed side by side with respect to one another.

The columns of seats may each be formed by several assemblies 10 of two seats 11.1, 11.2 arranged behind one another.

The side group or groups G_lat are respectively separated from the central group G_cent by an aisle 29. The passenger of each seat 11.1, 11.2 has direct access to the corresponding aisle 29. As a variant, the side groups G_lat may each be formed by more than one column of assemblies 10 of seats 11.1, 11.2. The central group G_cent may also include a single column, or more than two columns, of assemblies 10 of seats 11.1, 11.2.

Of course the different features, variants and/or embodiments of the present invention can be associated with one another in various combinations insofar as they are not incompatible or exclusive with one another.

Obviously, the invention is not limited to the embodiments described above and provided by way of example only. It encompasses various modifications, alternative forms and other variants a person skilled in the art may consider in the context of the present invention and in particular any combination of the various operating modes described above, which may be taken separately or in combination.

The invention claimed is:

1. An assembly of individual seats to be installed in an aircraft cabin, said assembly comprising:
   a first seat and a second seat facing each other, each seat comprising a seating surface and a backrest,
   a central console between the first seat and the second seat, said central console comprising a first foot zone and a second foot zone extending in two opposite directions,
   the first foot zone being associated with the first seat facing an opening of the first foot zone, said first foot zone being delimited by an upper wall forming a table for a passenger in the second seat with no access to the opening of the first foot zone,
   the second foot zone being associated with the second seat facing an opening of the second foot zone, said second foot zone being delimited by an upper wall forming a table for a passenger in the first seat with no have access to the opening of the second foot zone,
   characterized in that a width of the seating surface of the first seat is smaller in a part of the seating surface facing the second foot zone than a width of a part of the seating surface facing the first foot zone as to increase a space between the seating surface of the first seat and the second foot zone,
   and in that said assembly comprises a double-door module provided with two doors movable between a stored position and an extended position in which a door is able of transversely closing a corresponding space between a seat and the central console, the doors at least partly overlapping inside the double-door module when the doors are in the stored position,
   wherein in the part of the seating surface of the first seat facing the second foot zone, at least a portion of a front edge of said seating surface has a curved shape, this curved portion of the front edge of the seating surface is located in the extension of a rectilinear portion of the front edge facing the first foot zone, the curved portion extending from the middle of the seating surface of the first seat up to the extremity of the seating surface of the first seat positioned on the side of the second foot zone, the curved portion being defined by a radius of curvature of about 70 cm,
   wherein a width of the seating surface of the second seat is smaller in a part facing the first foot zone than a width of a part of the seating surface facing the second foot zone so as to increase a space between the seating surface of the second seat and the first foot zone,
   wherein in the part of the seating surface of the second seat facing the first foot zone, at least a portion of a front edge of said seating surface has a curved shape, this curved portion of the front edge of the seating surface is in the extension of a rectilinear portion of the front edge facing the second foot zone, the curved portion extending from the middle of the seating surface of the second seat up to the extremity of the seating surface of the second seat positioned on the side of the first foot zone, the curved portion being defined by a radius of curvature of about 70 cm.

2. The assembly of seats according to claim 1, characterized in that each seat has side edges aligned with side edges of the other seat.

3. The assembly of seats according to claim 1, characterized in that it comprises two retractable panels movable between a stored position and an extended position in which a panel closes a corresponding space above a side edge of a seat on the side of an aisle.

4. The assembly according to claim 1, characterized in that a ratio of a sum of a width of the central console and two thicknesses of fixed shells surrounding the backrests divided by a length of one pitch of said assembly of two seats is between 25% and 40%.

5. The assembly of seats according to claim 1, characterized in that, as a seat is convertible between a seating position and a lying position, a space between the seat and the central console is to be filled by at least a portion of the seat when the latter is in the lying position.

6. The assembly of seats according to claim 5, characterized in that, when a seat is in the lying position, at least a portion of the seating surface is vertically superimposed with a closed foot zone on the side of the seat comprising the seating surface.

7. The assembly of seats according to claim 1, characterized in that, as a lying surface is formed by at least a portion of the seating surface and at least a portion of the backrest when the seat is in the lying position as well as an internal wall of the open foot zone associated with said seat, a ratio of an area of the lying surface to an area of a living space associated with a seat is between 90% and 100%.

8. The assembly of seats according to claim 1, characterized in that the central console has a partition wall.

9. An aircraft cabin, characterized in that it comprises at least one column of assemblies of seats as defined according to claim 1.

* * * * *